(12) United States Patent
Tang

(10) Patent No.: US 11,026,158 B2
(45) Date of Patent: Jun. 1, 2021

(54) INFORMATION TRANSMISSION METHOD AND DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/302,179

(22) PCT Filed: Jul. 11, 2016

(86) PCT No.: PCT/CN2016/089636
§ 371 (c)(1),
(2) Date: Nov. 16, 2018

(87) PCT Pub. No.: WO2018/010063
PCT Pub. Date: Jan. 18, 2018

(65) Prior Publication Data
US 2019/0274091 A1    Sep. 5, 2019

(51) Int. Cl.
  H04W 48/12     (2009.01)
  H04W 28/06     (2009.01)
  H04W 72/04     (2009.01)
  H04W 72/12     (2009.01)
  H04W 48/08     (2009.01)

(52) U.S. Cl.
  CPC ......... *H04W 48/12* (2013.01); *H04W 28/06* (2013.01); *H04W 48/08* (2013.01); *H04W 72/0493* (2013.01); *H04W 72/1289* (2013.01)

(58) Field of Classification Search
  CPC .................. H04W 48/12; H04W 72/0493
  See application file for complete search history.

(56) References Cited

U.S. PATENT DOCUMENTS

| 8,938,233 B2* | 1/2015 | Hsu ........................ H04W 4/70 |
| | | 455/432.1 |
| 9,264,988 B2* | 2/2016 | Nigam ............... H04W 52/0206 |
| 10,064,211 B2* | 8/2018 | Pelletier ............. G06Q 30/0267 |
| 10,091,762 B2* | 10/2018 | Kitazoe ................. H04W 68/02 |

(Continued)

FOREIGN PATENT DOCUMENTS

| CN | 101500282 A | 8/2009 |
| CN | 101697614 A | 4/2010 |

(Continued)

OTHER PUBLICATIONS

International Search Report in international application No. PCT/CN2016/089636, dated Mar. 31, 2017.

(Continued)

*Primary Examiner* — Parth Patel

(57) ABSTRACT

Provided in the embodiment of the present application is an information transmission method and device. The method comprises: a network equipment sends scheduling information of system information; and the network equipment sends the system information according to the scheduling information. The method and the device can save signaling overheads and increase the utilization rate of resources.

14 Claims, 3 Drawing Sheets

100

A network device sends scheduling information for system information — S110

The network device sends the system information according to the scheduling information — S120

(56) References Cited

U.S. PATENT DOCUMENTS

| | | | |
|---|---|---|---|
| 10,390,320 B2* | 8/2019 | Xiong | H04W 56/0015 |
| 10,477,570 B2* | 11/2019 | Kalhan | H04W 72/0446 |
| 2010/0022250 A1 | 1/2010 | Petrovic | |
| 2010/0272015 A1 | 10/2010 | Chmiel | |
| 2010/0297991 A1* | 11/2010 | Dahlman | H04L 1/08 |
| | | | 455/422.1 |
| 2011/0292893 A1 | 12/2011 | Lee | |
| 2012/0039256 A1* | 2/2012 | Kwon | H04W 48/12 |
| | | | 370/328 |
| 2013/0128841 A1* | 5/2013 | Choi | H04W 48/12 |
| | | | 370/329 |
| 2013/0301565 A1 | 11/2013 | Xu et al. | |
| 2014/0341059 A1* | 11/2014 | Jang | H04W 48/06 |
| | | | 370/252 |
| 2015/0071223 A1* | 3/2015 | Lee | H04W 84/042 |
| | | | 370/329 |
| 2015/0173039 A1* | 6/2015 | Rune | H04W 52/0216 |
| | | | 370/311 |
| 2015/0195094 A1* | 7/2015 | Yu | H04W 4/70 |
| | | | 370/312 |
| 2015/0195774 A1* | 7/2015 | Lee | H04W 72/1226 |
| | | | 370/312 |
| 2015/0223028 A1* | 8/2015 | Wang | H04W 4/70 |
| | | | 370/312 |
| 2015/0223258 A1 | 8/2015 | Jung et al. | |
| 2015/0341831 A1 | 11/2015 | Liu et al. | |
| 2015/0341957 A1* | 11/2015 | Tang | H04W 72/1289 |
| | | | 370/329 |
| 2016/0212608 A1* | 7/2016 | Fukuta | H04W 76/14 |
| 2016/0212665 A1 | 7/2016 | Fukuta et al. | |
| 2016/0242206 A1* | 8/2016 | Ohlsson | H04W 72/1231 |
| 2016/0302024 A1* | 10/2016 | Bennett | H04W 4/70 |
| 2016/0338008 A1* | 11/2016 | Xia | H04W 48/10 |
| 2017/0055246 A1* | 2/2017 | Tabet | H04W 72/042 |
| 2017/0251500 A1* | 8/2017 | Agiwal | H04W 72/0413 |
| 2017/0303239 A1* | 10/2017 | Sagfors | H04W 72/02 |
| 2017/0303272 A1* | 10/2017 | Li | H04W 4/44 |
| 2018/0019839 A1* | 1/2018 | Chen | H04L 1/0038 |
| 2018/0049190 A1* | 2/2018 | Abedini | H04W 76/14 |
| 2018/0139586 A1* | 5/2018 | Park | H04L 5/0048 |
| 2018/0152822 A1* | 5/2018 | Lee | H04W 48/12 |
| 2018/0220363 A1* | 8/2018 | Hoglund | H04W 48/02 |
| 2018/0255529 A1* | 9/2018 | Yu | H04W 68/02 |
| 2018/0324757 A1* | 11/2018 | Chai | H04W 76/27 |
| 2018/0376525 A1* | 12/2018 | Feng | H04W 76/14 |
| 2019/0075561 A1* | 3/2019 | Tang | H04L 5/0053 |
| 2019/0110275 A1* | 4/2019 | Hapsari | H04W 72/04 |
| 2019/0116578 A1* | 4/2019 | Tang | H04W 24/02 |
| 2019/0141615 A1* | 5/2019 | Breuer | H04W 48/12 |
| 2019/0150107 A1* | 5/2019 | Tang | H04W 4/80 |
| | | | 370/329 |
| 2019/0159110 A1* | 5/2019 | Takahashi | H04W 48/14 |
| 2019/0174554 A1* | 6/2019 | Deenoo | H04W 80/02 |
| 2019/0274091 A1* | 9/2019 | Tang | H04W 72/1289 |
| 2019/0274094 A1* | 9/2019 | Lu | H04W 72/042 |
| 2019/0306853 A1* | 10/2019 | Ishii | H04W 72/0413 |
| 2019/0312711 A1* | 10/2019 | Stern-Berkowitz | |
| | | | H04L 5/0053 |
| 2019/0342870 A1* | 11/2019 | Shen | H04W 72/0453 |

FOREIGN PATENT DOCUMENTS

| | | |
|---|---|---|
| CN | 101848537 A | 9/2010 |
| CN | 101998580 A | 3/2011 |
| CN | 102917437 A | 2/2013 |
| CN | 104782185 A | 7/2015 |
| CN | 105208635 A | 12/2015 |
| EP | 1909520 A1 | 4/2008 |
| EP | 2076066 A1 | 7/2009 |
| EP | 2493223 A1 | 8/2012 |
| EP | 2897416 A2 | 7/2015 |
| IN | 201817047525 A | 2/2019 |
| JP | 2012524433 A | 10/2012 |
| RU | 2413362 C2 | 2/2011 |
| TW | 201545578 A | 12/2015 |
| WO | 2013107361 A1 | 7/2013 |
| WO | 2015080145 A1 | 6/2015 |
| WO | 2016106713 A1 | 7/2016 |

OTHER PUBLICATIONS

Written Opinion of the International Search Authority in international application No. PCT/CN2016/089636, dated Mar. 31, 2017.

First Office Action of Chinese application No. 201680085786.9, dated Aug. 8, 2019.

Second Office Action of Chinese application No. 201680085786.9, dated Oct. 23, 2019.

First Office Action of Russian application No. 2018144674, dated Sep. 23, 2019.

LG Electronics Inc:"Update of the SIB including inter-freq D2D configuration", 3GPP Draft; R2-156499 Upoate of the SIB Incluoing Inter-Freq D2D Configuration, 3rd Generation Partnership Project (3GPP), Mobile Competence Centre; 650, Route Des Lucioles; F-06921 Sophia-Antipolis, vol. RAN WG2, No. Anaheim, US; Nov. 15, 2015-Nov. 20, 2015; Nov. 16, 2015 (Nov. 16, 2015), XP051005902.

OPPO: "Discussion on the on demand SI", 3GPP Draft; R1-1718778, 3rd Generation Partnership Project (3GPP ), Mobile Competence Centre; 650, Route Des Lucioles; F-06921 Sophia-Antipolis Cedex, France, vol. RAN WG1, No. Prague, CZ; Oct. 9, 2017-Oct. 13, 2017 Oct. 8, 2017 (Oct. 8, 2017), XP051341943.

Supplementary European Search Report in the European application No. 16908395.3, dated Feb. 18, 2019.

English Translation of the Written Opinion of the International Search Authority in the international application No. PCT/CN2016/089636, dated Mar. 31, 2017.

Samsung, "System Information Signalling Design in NR", 3GPP TSG-RAN WG2 Meeting #94 R2-163371 Nanjing, China, May 23-27, 2016.

Ericsson, "Requirements for System Information distribution", 3GPP TSG-RAN WG2 #94 Tdoc R2-164006 Nanjing, P.R. China, May 23-27, 2016.

LG Electronics Inc., "Observations about on-demand Si delivery mechanism", 3GPP TSG-RAN WG2 #94 R2-164078 Nanjing, China, May 23-27, 2016.

Qualcomm Incorporated, Convida Wireless, "NR System Information Provisioning", 3GPP TSG-RAN WG2 Meeting #94 R2-164122 Nanjing, Chaina May 23-27, 2016.

Huawei, HiSilicon, "System information design", 3GPP TSG-RAN2 Meeting #94 R2-164127 Nanjing, China, May 23-27, 2016.

ZTE, "Consideration on System Information Broadcast in New RAT", 3GPP TSG-RAN WG2#93bis R2-162629, 3GPP, Apr. 1, 2016.

InterDigital Communications, "System Information Acquisition for New Radio Access", 3GPP TSG-RAN WG2#94 3GPP. May 14, 2016.

First Office Action of the Japanese application No. 2018-561259, dated Jun. 2, 2020.

Third Office Action of the Chinese application No. 201680085786.9, dated Jun. 9, 2020.

Office Action of the Indian application No. 201817048594, dated Jul. 6, 2020.

First Office Action of the Brazilian application No. BR1120180762148, dated Jul. 28, 2020.

First Office Action of the European application No. 16908395.3, dated Jan. 7, 2020.

Notice of Rejection of the Chinese application No. 201680085786.9, dated Jan. 19, 2020.

Written Opinion of the Singaporean application No. 11201810562T, dated Mar. 6, 2020.

First Office Action of the Taiwanese application No. 106122458, dated Jan. 5, 2021.

European Search Report in the European application No. 20214916.7, dated Feb. 8, 2021.

(56) References Cited

OTHER PUBLICATIONS

Office Action of the Australian application No. 2016414700, dated Mar. 31, 2021.

\* cited by examiner

INFORMATION TRANSMISSION METHOD AND DEVICE

TECHNICAL FIELD

The application relates to the field of communication, and more particularly to an information transmission method and device.

BACKGROUND

In a Long Term Evolution (LTE) system, a terminal device, after establishing a downlink synchronization message with a serving cell, receives system information sent by the serving cell in a broadcast signaling manner to obtain related information of the serving cell. The system information mainly includes a Master Information Block (MIB), a System Information Block (SIB) 1, a SIB2, a SIB3, a SIB4, a SIB5, a SIB6, a SIB7, a SIB8 and the like. Each SIB includes different information. For example, the MIB includes a system frame number, a downlink system bandwidth and a Physical Hybrid Automatic Repeat Request (ARQ) Indicator Channel (PHICH). The SIB1 includes cell selection and residence related information and scheduling information of the other SIBs. The SIB2 includes access restriction information, a common channel parameter, scheduling information of a Multicast Broadcast Single Frequency Network (MBSFN) subframe and the like. The system information is periodically sent in the cell in a broadcast manner and terminals in either a data connection state or an idle state may receive the system information. However, in a practical application process, part of system information sent by a network device may not be required by a terminal device but is still periodically sent by the network device, which may result in serious resource waste and further make a resource utilization rate not so high.

SUMMARY

Embodiments of the application provide an information transmission method and device, which may increase a resource utilization rate.

A first aspect provides an information transmission method, which may include that: a network device sends scheduling information for system information; and the network device sends the system information according to the scheduling information.

In the embodiments of the application, the network device sends the scheduling information, a terminal device receives the scheduling information, then the network device sends the system information according to the scheduling information and the terminal device receives the system information according to the scheduling information. Therefore, the network device is prevented from periodically sending the system information, a signaling overhead may be reduced and a resource utilization rate may be increased.

Optionally, the system information includes common system information and/or dedicated system information.

Alternatively, the system information may be divided into the dedicated system information and the common system information. The common system information may be essential system information required by all terminal devices, for example, including the most essential system information used for searching, camping on the cell and access to the cell in an LTE network, a MIB, a SIB1 and a SIB2. The dedicated system information may be system information required to be used for a certain terminal device, may also be system information required by terminal devices of a certain type and may further be system information required by a certain specific service, for example, including a SIB18 and SIB19 related to a Device to Device (D2D) service in the LTE network. For example, dedicated system information for a mobile phone, a Personal Computer (PC) and an Internet of things terminal may be different and dedicated system information for a data service and a telephone service may be different. Of course, the dedicated system information may refer to a piece, a type or a group of system information. Division of the system information is not limited in the embodiments of the application.

In a first possible implementation mode of the first aspect, before the operation that the network device sends the scheduling information for the system information, the method may further include that: the network device sends first indication information, the first indication information indicating at least one of dedicated system information supported by the network device or common system information supported by the network device.

In the embodiments of the application, the terminal device requiring the system information does not know a system information type supported by the network device, and thus the first indication information is required to be sent to indicate the type supported by the network device before the network device sends the scheduling information for the system information, a unicast, multicast or broadcast manner being adopted for sending. In such a manner, the terminal device may acquire the system information supported by the network device and further receive the system information according to the scheduling information for the system information supported by the network device.

In combination with the abovementioned possible implementation mode of the first aspect, in a second possible implementation mode of the first aspect, before the operation that the network device sends the system information according to the scheduling information, the method may further include that: the network device sends second indication information, the second indication information indicating a sending manner for the system information.

In the embodiments of the application, the network device is required to notify the terminal device of the manner for the system information. For example, all the system information is sent in a scheduling manner and namely is sent in a scheduling information manner. Or the common system information is sent in a fixed resource location manner and the dedicated system information is sent in the scheduling manner. Or part of the dedicated system information is sent in the fixed resource location manner and the other part of the dedicated system information is sent in the scheduling manner. Or part of the common system information is sent on the basis of a fixed resource location and the other part of the common system information is sent in the scheduling manner. The embodiments of the application are not limited thereto.

Alternatively, the first indication information and the second indication information may be the same indication information and may also be two pieces of different indication information. The first indication information and the second indication information may be sent simultaneously and may also be sent respectively. The first indication information and the second indication information may be sent simultaneously in the unicast, broadcast or multicast manner. Or the first indication information is sent in the broadcast manner and the second indication information is sent in the multicast manner. Or the first indication information is sent in the unicast manner and the second indication information is sent in the multicast manner. The embodiments of the application are not limited thereto. Examples will not be limited one by one herein to avoid elaborations.

In combination with the abovementioned possible implementation modes of the first aspect, in a third possible implementation mode of the first aspect, the system information may include at least one of dedicated system information or common system information, the second indication information may be configured to indicate that a sending manner for the dedicated system information is based on scheduling, and/or the second indication information may be configured to indicate that a sending manner for the common system information is based on scheduling or based on pre-configured radio resource.

In the embodiments of the application, the second indication information may specifically indicate that the sending manner for the dedicated system information is based on scheduling and it is determined as a default that the sending manner for the common system information is fixed resource location-based sending. Or the second indication information may specifically indicate that the sending manner for the common system information is fixed resource location-based sending and it is determined as a default that the sending manner for the dedicated system information is based on scheduling. Or the second indication information may specifically indicate that the sending manner for the common system information is fixed resource location-based sending and the sending manner for the dedicated system information is based on scheduling. Or the second indication information may specifically indicate that the sending manner for the common system information is based on scheduling and the sending manner for the dedicated system information is also based on scheduling.

Alternatively, how to specifically indicate the sending manner by the second indication information may be configured for a terminal through a network and may also be specified according to a network protocol. The embodiments of the application are not limited thereto.

In combination with the abovementioned possible implementation modes of the first aspect, in a fourth implementation mode of the first aspect, the system information may include the common system information, and the scheduling information for the system information may include at least one of a time-frequency resource occupied by the common system information, a scheduling period of the common system information, a modulation and coding scheme of the common system information and a valid time of the common system information. Of course, the information is not intended to form any limit and other information may further be included.

In the embodiments of the application, if the terminal device has acquired the time-frequency resource occupied by the common system information, the system information may only include the scheduling period of the common system information and/or the modulation and coding scheme for the common system information, etc. For example, for compatibility with an existing network, when period information and time-frequency resource information of the common system information may be acquired in an existing network state, the scheduling information in the embodiments of the application may only include the modulation and coding scheme and/or the valid information of the common system information, etc. Of course, all of the period information, time-frequency resource, modulation and coding scheme and the like of the common system information may also be included.

In combination with the abovementioned possible implementation modes of the first aspect, in a fifth implementation mode of the first aspect, the system information may include the dedicated system information, and the scheduling information for the system information may include at least one of time-frequency resource information of the dedicated system information, a modulation and coding scheme of the dedicated system information, scheduling period information of the dedicated system information, a valid time of a period of the dedicated system information, mode information of the dedicated system information or a valid time of a mode of the dedicated system information.

In the embodiments of the application, if the terminal device has acquired a time-frequency resource occupied by the dedicated system information, the system information may only include a sending period of the dedicated system information and/or the modulation and coding scheme of the common system information, etc. For example, for compatibility with the existing network, when the period information and time-frequency resource information of the dedicated system information may be acquired in the existing network state, the scheduling information in the embodiments of the application may only include at least one of the modulation and coding scheme, the valid time of the dedicated system information and the valid time of the mode of the dedicated system information, etc. Of course, all of the period information, time-frequency resource, modulation and coding scheme and the like of the dedicated system information may also be included.

The abovementioned scheduling information includes scheduling information of the common system information and/or scheduling information for the dedicated system information. The scheduling information may be scheduling information in a new network and may also be scheduling information compatible with the existing network. The embodiments of the application are not limited thereto.

In combination with the abovementioned possible implementation modes of the first aspect, in a sixth implementation mode of the first aspect, the system information may include the dedicated system information, and the operation that the network device sends the scheduling information for the system information may include that: the network device sends scheduling information for the dedicated system information through the common system information.

In the embodiments of the application, for how to send the scheduling information for the dedicated system information by the network device, the scheduling information for the dedicated system information may be sent in an independent broadcast, unicast or multicast manner and may also be sent in a manner of containing the scheduling information for the dedicated system information in the system information. It may be specified by the network protocol that a certain common system information contains the scheduling information for the dedicated system information. It may also be specified by the network protocol that some common system information contains the scheduling information for the dedicated system information. The embodiments of the application are not limited thereto.

Alternatively, the network device may send the scheduling information of the common system information in the independent broadcast, unicast or multicast manner and may also contain the scheduling information of the common system information in the dedicated system information for sending. It may be specified by the network protocol that a certain dedicated system information contains the scheduling information of the common system information. It may also be specified by the network protocol that some dedicated system information contains the scheduling information of the common system information. The embodiments of the application are not limited thereto.

In combination with the abovementioned possible implementation modes of the first aspect, in a seventh implementation mode of the first aspect, the system information may include the dedicated system information, and the operation that the network device sends the scheduling information for the system information may include that: the network device sends third indication information, the third indication information indicating the scheduling information for the dedicated system information.

In the embodiments of the application, the scheduling information for the dedicated system information may be indicated by the third indication information. For example, a certain special bit indicates the scheduling information for the dedicated system information.

For example, when the bit is 0, it may be indicated that a first resource block is adopted to send the dedicated system information. When the bit is 1, it may be indicated that a second resource block may be adopted to send the dedicated system information. Specifically, an indication manner of the third indication information may be configured according to the network and may also be specified according to the network protocol. The third indication information may also be sent in the multicast, unicast or broadcast manner. Of course, scheduling information of multiple pieces of dedicated system information may be sent together and may also be sent in at least two parts. Part of the third indication information may be sent in the multicast manner, the other part of the third indication information is sent in the broadcast manner, and the like.

Alternatively, the scheduling information of the common system information may also be indicated through indication information. The embodiments of the application are not limited thereto. The indication information for the scheduling information of the common system information may be sent together with the third indication information and may also be sent respectively. The broadcast, unicast or multicast manner may be adopted for sending. The embodiments of the application are not limited thereto.

In combination with the abovementioned possible implementation modes of the first aspect, in an eighth implementation mode of the first aspect, the system information may include the dedicated system information, and the operation that a terminal device receives the scheduling information for the system information from the network device may include that: the terminal device receives at least one scheduling information sent by the network device, each scheduling information in the at least one scheduling information corresponding to at least one dedicated system information.

In combination with the abovementioned possible implementation modes of the first aspect, in a ninth implementation mode of the first aspect, before the operation that the network device sends the system information according to the scheduling information, the network device may send identification information, the identification information being configured to identify valid scheduling information in the at least one scheduling information; and the operation that the network device sends the system information according to the scheduling information may include that: the network device sends the dedicated system information corresponding to the valid scheduling information according to the valid scheduling information.

In the embodiments of the application, each scheduling information in the at least one scheduling information corresponds to one or more pieces of dedicated system information. That is, two pieces of dedicated system information may share the same scheduling information and a dedicated system information may also correspond to a scheduling information. When the network device sends the at least one scheduling information to the terminal device, the terminal device receives the at least one scheduling information. The network device may not send the dedicated system information corresponding to all of the scheduling information. Therefore, the network device is required to send the identification information, the identification information being adopted to identify the valid scheduling information. The network device may send the dedicated system information corresponding to the valid scheduling information. The terminal device may receive the dedicated system information corresponding to the valid scheduling information.

Alternatively, the network device may also send multiple pieces of scheduling information to the terminal device, each scheduling information in the multiple pieces of scheduling information corresponding to at least one common system information. The network device is required to send identification information of the multiple pieces of scheduling information to the terminal device to identify the common system information corresponding to valid scheduling information. The terminal device receives the common system information on the corresponding valid scheduling information. The embodiments of the application are not limited thereto.

Alternatively, sending of the at least one scheduling information by the network device may be direct sending by the network device. Sending of the at least one scheduling information by the network device may be sending based on a request of the terminal device. The terminal device sends a request message to the network device, the request message being configured to request for first dedicated system information. The network device may not only send scheduling information for the first dedicated system information according to the request message but also send the scheduling information of all or part of the dedicated system information supported by the network device. Of course, the broadcast, unicast or multicast manner or the like may be adopted for sending.

In combination with the abovementioned possible implementation modes of the first aspect, in a tenth implementation mode of the first aspect, before the operation that the network device sends the scheduling information for the system information, the method may further include that: the network device receives a request message sent by the terminal device, the request message being configured to request for first dedicated system information; and the operation that the network device sends the scheduling information for the system information may include that: the network device sends scheduling information for the first dedicated system information according to the request message.

In an embodiment of the application, the terminal device sends the request message configured to request for the first dedicated system information to the network device and the network device may send the scheduling information for the first dedicated system information according to the request message and may also send the scheduling information of all or part of the dedicated system information. There are no limits made thereto in the embodiments of the application.

In combination with the abovementioned possible implementation modes of the first aspect, in an eleventh implementation mode of the first aspect, the operation that the network device sends the system information according to the scheduling information may include that: the network device sends the dedicated system information according to a sending mode for the dedicated system information, the sending mode including a one-time sending mode, a multiple aperiodic sending mode or a periodic sending mode.

In the embodiments of the application, for how to send the dedicated system information by the network device, the dedicated system information may be sent according to a configuration of the network device. For example, the dedicated system information is sent once in the broadcast, unicast or multicast manner. Or the dedicated system information is sent for many times in the broadcast, unicast or multicast manner and sending for many times in the broadcast, unicast or multicast manner may refer to sending at unequal time intervals. Or the dedicated system information is periodically sent in the broadcast, unicast or multicast manner. Specifically, the one-time sending mode, the multiple aperiodic sending mode or the periodic sending mode may be indicated through the scheduling information and may also be configured through the network. The embodiments of the application are not limited thereto.

Alternatively, the same or different sending modes may be adopted for each dedicated system information. For example, the multiple aperiodic sending mode may be adopted for the first dedicated system information and the periodic sending mode may be adopted for second dedicated system information. Or the multiple aperiodic sending mode is adopted for the first dedicated system information in a specific time period, the one-time sending mode is adopted for the first dedicated system information in another time period, and the like. The specific sending mode adopted for each dedicated system information may be configured through the network or specified through the network protocol. The embodiments of the application are not limited thereto.

In combination with the abovementioned possible implementation modes of the first aspect, in a twelfth implementation mode of the first aspect, the operation that the network device sends the scheduling information for the system information may include that: the network device sends the scheduling information for the system information in the unicast, multicast or broadcast manner.

In the embodiments of the application, there may be one or more pieces of scheduling information. The scheduling information may be sent in the unicast, multicast or broadcast manner. Or part of the scheduling information is sent in the broadcast manner and part of the scheduling information is sent in the multicast manner and the like.

In combination with the abovementioned possible implementation modes of the first aspect, in a thirteenth implementation mode of the first aspect, the operation that the network device sends the system information according to the scheduling information may include that: the network device sends the system information according to the scheduling information in the unicast, multicast or broadcast manner.

In the embodiments of the application, there may be one or more pieces of system information. The system information may be sent in the unicast, multicast or broadcast manner. Or part of the system information is sent in the broadcast manner and part of the system information is sent in the multicast manner and the like. Specifically, the dedicated system information may be sent in the multicast, unicast or broadcast manner. The common system information may be sent in the multicast, unicast or broadcast manner. Or part of the dedicated system information is sent in the broadcast manner and part of the dedicated system information is sent in the unicast manner. Or part of the common system information is sent in the broadcast manner and part of the common system information is sent in the multicast manner and the like.

A second aspect provides an information transmission method, which may include that: a terminal device receives scheduling information for system information from a network device; and the terminal device receives the system information sent by the network device according to the scheduling information.

In a first possible implementation mode of the second aspect, before the operation that the terminal device receives the scheduling information for the system information from the network device, the method may further include that: the terminal device receives first indication information sent by the network device, the first indication information indicating at least one of dedicated system information supported by the network device or common system information supported by the network device.

Optionally, the terminal device requiring the system information may determine whether the network device supports the system information required by the terminal device or not according to the first indication information. When the network device supports the system information required by the terminal device, the terminal device sends a request message to the network device to request for the required system information. Therefore, the terminal device may be prevented from blindly sending the request message, a signaling overhead may further be reduced and a resource utilization rate may be increased.

In combination with the abovementioned possible implementation mode of the second aspect, in a second implementation mode of the second aspect, before the operation that the terminal device receives the system information sent by the network device according to the scheduling information, the method may further include that: the terminal device receives second indication information sent by the network device, the second indication information indicating a sending manner for the system information.

In combination with the abovementioned possible implementation modes of the second aspect, in a third possible implementation mode of the second aspect, the system information may include at least one of dedicated system information or common system information, the second indication information may be configured to indicate that a sending manner for the dedicated system information is based on scheduling, and/or the second indication information may be configured to indicate that a sending manner for the common system information is based on scheduling or based on pre-configured radio resource.

In combination with the abovementioned possible implementation modes of the second aspect, in a fourth implementation mode of the second aspect, the system information may include the common system information, and the scheduling information for the system information may include at least one of a time-frequency resource occupied by the common system information, a scheduling period of the common system information, a modulation and coding scheme of the common system information or a valid time of the scheduling period of the common system information.

In combination with the abovementioned possible implementation modes of the second aspect, in a fifth implementation mode of the second aspect, the system information may include the dedicated system information, and the scheduling information for the system information may include at least one of time-frequency resource information of the dedicated system information, a modulation and coding scheme of the dedicated system information, scheduling period information of the dedicated system information, a valid time of a period of the dedicated system information, mode information of the dedicated system information or a valid time of a mode of the dedicated system information.

In combination with the abovementioned possible implementation modes of the second aspect, in a sixth implementation mode of the second aspect, the system information may include the dedicated system information, and the operation that the terminal device receives the scheduling information for the system information from the network device may include that: the terminal device receives scheduling information, sent by the network device through the system information, of the dedicated system information.

In combination with the abovementioned possible implementation modes of the second aspect, in a seventh implementation mode of the second aspect, the system information may include the dedicated system information, and the operation that the terminal device receives the scheduling information for the system information from the network device may include that: the terminal device receives third indication information sent by the network device, the third indication information indicating the scheduling information for the dedicated system information.

In combination with the abovementioned possible implementation modes of the second aspect, in an eighth implementation mode of the second aspect, the system information may include the dedicated system information, and the operation that the terminal device receives the scheduling information for the system information from the network device may include that: the terminal device receives at least one scheduling information sent by the network device, each scheduling information in the at least one scheduling information corresponding to at least one dedicated system information.

In combination with the abovementioned possible implementation modes of the second aspect, in a ninth implementation mode of the second aspect, before the operation that the terminal device receives the system information sent by the network device, the method may further include that: the terminal device receives identification information sent by the network device, the identification information being configured to identify valid scheduling information in the at least one scheduling information: and the operation that the terminal device receives the system information sent by the network device according to the scheduling information may include that: the terminal device receives the dedicated system information corresponding to the valid scheduling information according to the valid scheduling information.

In combination with the abovementioned possible implementation modes of the second aspect, in a tenth implementation mode of the second aspect, before the operation that the terminal device receives the scheduling information for the system information from the network device, the method may further include that: the terminal device sends a request message to the network device, the request message being configured to request for first dedicated system information; and the operation that the terminal device receives the scheduling information for the system information may include that: the terminal device receives scheduling information, sent by the network device according to the request message, of the first dedicated system information.

Alternatively, the terminal device determines whether the network device supports the first dedicated system information or not according to the first indication information. When the network device supports the first dedicated system information, the terminal device sends the request message to the network device. The terminal device, responsive to determining that the network device does not support the first dedicated system information according to the first indication information, may not send request information to the network device.

A third aspect provides an information transmission device, which is configured to execute the method in the first aspect or any possible implementation mode of the first aspect. Specifically, the device includes units configured to execute the method in the first aspect or any possible implementation mode of the first aspect.

A fourth aspect provides an information transmission device, which is configured to execute the method in the second aspect or any possible implementation mode of the second aspect. Specifically, the device includes units configured to execute the method in the second aspect or any possible implementation mode of the second aspect.

A fifth aspect provides an information transmission device, which includes a receiver, a sender, a memory, a processor and a bus system. The receiver, the sender, the memory and the processor are connected through the bus system. The memory is configured to store an instruction. The processor is configured to execute the instruction stored in the memory to control the receiver to receive signals and control the sender to send signals. When the processor executes the instruction stored in the memory, such execution enables the processor to execute the method in the first aspect or any possible implementation mode of the first aspect.

A sixth aspect provides an information transmission device, which includes a receiver, a sender, a memory, a processor and a bus system. The receiver, the sender, the memory and the processor are connected through the bus system. The memory is configured to store an instruction. The processor is configured to execute the instruction stored in the memory to control the receiver to receive signals and control the sender to send signals. When the processor executes the instruction stored in the memory, such execution enables the processor to execute the method in the second aspect or any possible implementation mode of the second aspect.

A seventh aspect provides an information transmission system, which includes the device of the fifth aspect and at least one device of the sixth aspect.

An eighth aspect provides a computer-readable medium, which is configured to store a computer program, the computer program including an instruction configured to execute the method in the first aspect or any possible implementation mode of the first aspect.

A ninth aspect provides a computer-readable medium, which is configured to store a computer program, the computer program including an instruction configured to execute the method in the second aspect or any possible implementation mode of the second aspect.

BRIEF DESCRIPTION OF DRAWINGS

In order to describe the technical solutions of the embodiments of the application more clearly, the drawings required to be used in descriptions about the embodiments or a conventional art will be simply introduced below. It is apparent that the drawings described below are only some embodiments of the application. Other drawings may further be obtained by those of ordinary skill in the art according to these drawings without creative work.

DETAILED DESCRIPTION

Figure 1:
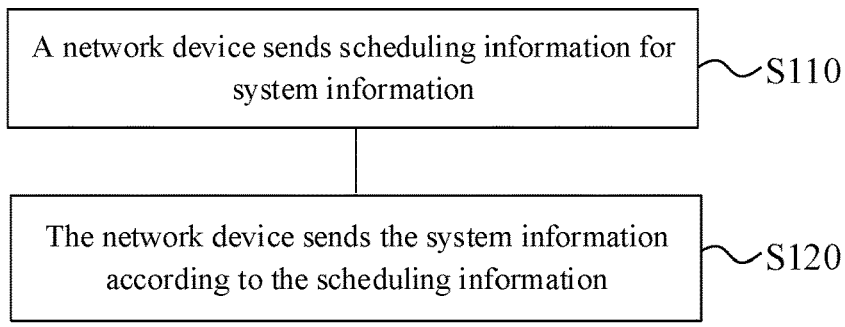
FIG. 1 is a schematic diagram of an information transmission method according to an embodiment of the application.

The technical solutions in the embodiments of the application will be clearly and completely described below in combination with the drawings in the embodiments of the application. It is apparent that the described embodiments are not all embodiments but part of embodiments of the application. All other embodiments obtained by those of ordinary skill in the art on the basis of the embodiments in the application without creative work shall fall within the scope of protection of the application.

It is to be understood that the technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a communication system which may emerge in the future.

It is also to be understood that, in the embodiments of the application, a terminal device may be called User Equipment (UE), a terminal device, a Mobile Station (MS), a mobile terminal, a terminal device in a future 5th-Generation (5G) network or the like. The terminal device may communicate with one or more core networks through a Radio Access Memory (RAN). For example, a terminal may be a mobile phone (or called a "cellular" phone) and a computer with a mobile terminal. For example, the terminal may also be a portable, pocket, handheld, computer-embedded or vehicle-mounted mobile device and performs voice and/or data exchange with the RAN.

In the embodiments of the application, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle-mounted device, a wearable device, a network device in the future 5G network, a network device in the future evolved Public Land Mobile Network (PLMN) or the like.

System information of the embodiments of the application may be configured to acquire related information of a serving cell. The system information mentioned in the embodiments of the application may include information of multiple SIBs and, for example, may at least include information of a SIB1, a SIB2, a SIB3, a SIB4, a SIB5, a SIB6, a SIB7 and a SIB8.

The SIB1 mainly includes cell selection and residence related information and scheduling information of the other SIBs. The SIB2 mainly includes access restriction information, a common channel parameter and scheduling information of an MBSFN subframe. The SIB3 mainly includes cell reselection related information. The SIB4 mainly includes same-frequency cell reselection information. The SIB5 mainly includes inter-frequency cell reselection information. The SIB6 mainly includes inter-system cell reselection information (UMTS Radio Access Network (UTRAN)). The SIB7 mainly includes inter-system cell reselection information (GSM/Enhanced Data Rate for GSM Evolution (EDGE). The SIB8 mainly includes inter-system cell reselection information (CDMA2000).

FIG. 1 is a schematic flowchart of an information transmission method 100 according to an embodiment of the application. FIG. 1 shows operations or operations of the information transmission method. However, these operations or operations are only examples. Other operations or transformations of each operation in FIG. 1 may also be executed in the embodiment of the application. The method 100 includes the following operations.

In S110, a network device sends scheduling information for system information.

In S120, the network device sends the system information according to the scheduling information.

Figure 2:
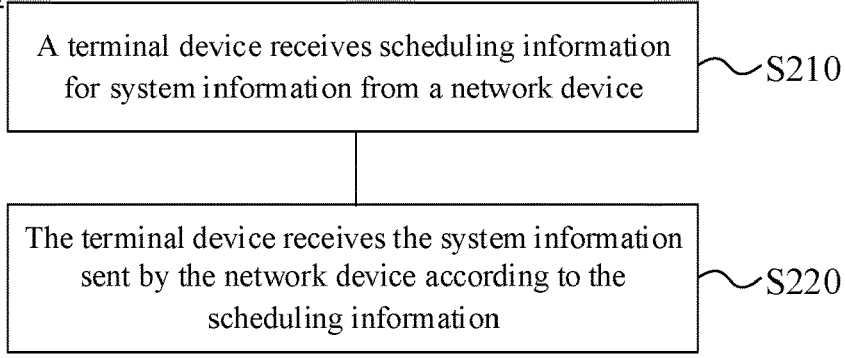
FIG. 2 is another schematic diagram of an information transmission method according to an embodiment of the application.

FIG. 2 is a schematic flowchart of an information transmission method 200 according to an embodiment of the application. FIG. 2 shows operations or operations of the information transmission method. However, these operations or operations are only examples. Other operations or transformations of each operation in FIG. 2 may also be executed in the embodiment of the application. The method 200 includes the following operations.

In S210, a terminal device receives scheduling information for system information from a network device.

In S220, the terminal device receives the system information sent by the network device according to the scheduling information.

Optionally, the network device sends the scheduling information, the terminal device receives the scheduling information, then the network device sends the system information according to the scheduling information and the terminal device receives the system information according to the scheduling information. Therefore, the network device is prevented from periodic sending, a signaling overhead may be reduced and a resource utilization rate may be increased.

Alternatively, the system information may be divided. The system information may be divided into dedicated system information and common system information. The common system information may be essential system information required by all terminal devices, for example, including the most basic system information used for residence and access in an LTE network, a MIB, a SIB1 and a SIB2. The dedicated system information may be system information required to be used for a certain terminal device, may also be system information required to be used for terminal devices of a certain type and may further be system information required to be used for a certain specific service, for example, including a SIB18 and SIB19 related to a D2D service in the LTE network. For example, dedicated system information for a mobile phone, a PC and an Internet of things terminal may be different and dedicated system information for a data service and a telephone service may be different. Of course, the dedicated system information may refer to a piece, a type or a group of system information. Division of the dedicated system information is not limited in the embodiment of the application.

Therefore, the dedicated system information in the embodiment may be dedicated system information of a terminal device, may also be dedicated system information of a terminal device of a specific type and may further be dedicated system information of a specific service type.

As an optional embodiment, before S110, the method 100 further includes that: the network device sends first indication information, the first indication information indicating at least one of dedicated system information supported by the network device or common system information supported by the network device. Before S210, the terminal device receives the first indication information sent by the network device.

In the embodiment of the application, the terminal device requiring the system information does not know a system information type supported by the network device, and thus the first indication information is required to be sent to indicate the type supported by the network device before the network device sends the scheduling information for the system information, a unicast, multicast or broadcast manner being adopted for sending. In such a manner, the terminal device may acquire the system information supported by the network device and further receive the system information according to the scheduling information for the system information supported by the network device.

As an optional embodiment, before S110, the method 100 further includes that: the network device sends second indication information, the second indication information indicating a sending manner for the system information. Before S210, the method 200 further includes that: the terminal device receives the second indication information sent by the network device.

In the embodiment of the application, the network device is required to notify the terminal device of the manner for the system information. For example, all the system information is sent in a scheduling manner and namely is sent in a scheduling information manner. Or the common system information is sent in a fixed resource location manner and the dedicated system information is sent in the scheduling manner. Or part of the dedicated system information is sent in the fixed resource location manner and the other part of the dedicated system information is sent in the scheduling manner. Or part of the common system information is sent on the basis of a fixed resource location and the other part of the common system information is sent in the scheduling manner. The embodiment of the application is not limited thereto.

Alternatively, the network device may simultaneously send the first indication information and the second indication information to the terminal device. The network device may also send the first indication information and the second indication information to the terminal device respectively. Specifically, the first indication information and the second indication information may be sent to the terminal device in a broadcast manner. The first indication information and the second indication information may also be sent to the terminal device in a multicast manner. Of course, the first indication information and the second indication information may be contained in a existing common system information for sending in the multicast or broadcast manner. The first indication information and the second indication information may be contained in two pieces of different existing common system information for sending to the terminal device in the multicast or broadcast manner. The specific sending manner to be adopted may be configured through the network device. The specific sending manner for the first indication information and the second indication information may also be specified through a network protocol. The embodiment of the application is not limited thereto.

It is to be understood that the network device may indicate the system information type supported by the network device through the first indication information and indicate the sending manner for the system information through the second indication information. However, the system information sent by the network device and the system information indicated by the first indication information and the second indication system may be consistent and may also be inconsistent. For example, the first indication information indicates the network device to support five types of dedicated system information and four types of common system information and the network device may only send scheduling information of two types of dedicated system information and scheduling information of three types of common system information. For another example, the second indication information indicates that a scheduling manner is adopted to send three types of dedicated system information and the network device may only send scheduling information of one or two types of dedicated system information. The embodiment of the application is not limited thereto.

As an optional embodiment, the system information includes at least one of dedicated system information or common system information, the second indication information indicates that a sending manner for the dedicated system information is based on scheduling, and/or the second indication information indicates that a sending manner for the common system information is based on scheduling or based on pre-configured radio resource.

Specifically, the second indication information may specifically indicate that the sending manner for the dedicated system information is based on scheduling and it is determined as a default that the sending manner for the common system information is fixed resource location-based sending. Or the second indication information may specifically indicate that the sending manner for the common system information is fixed resource location-based sending and it is determined as a default that the sending manner for the dedicated system information is based on scheduling. Or the second indication information may specifically indicate that the sending manner for the common system information is fixed resource location-based sending and the sending manner for the dedicated system information is based on scheduling. Or the second indication information may specifically indicate that the sending manner for the common system information is based on scheduling and the sending manner for the dedicated system information is also based on scheduling.

Alternatively, how to specifically indicate the sending manner by the second indication information may be configured for a terminal through a network and may also be specified according to a network protocol. The embodiment of the application is not limited thereto.

As an optional embodiment, the system information includes the common system information, and the scheduling information for the system information includes at least one of a time-frequency resource occupied by the common system information, a scheduling period of the common system information, a modulation and coding scheme of the common system information or a valid time of the scheduling period of the common system information.

In the embodiment of the application, if the terminal device has acquired the time-frequency resource occupied by the common system information, the system information may only include the scheduling period of the common system information and/or the modulation and coding scheme for the common system information, etc. For example, for compatibility with an existing network, when period information and time-frequency resource information of the common system information may be acquired in an existing network state, the scheduling information in the embodiments of the application may only include the modulation and coding scheme and/or the valid information of the common system information, etc. Of course, all of the period information, time-frequency resource, modulation and coding scheme and the like of the common system information may also be included.

As an optional embodiment, the system information includes the dedicated system information, and the scheduling information for the system information includes at least one of time-frequency resource information of the dedicated system information, a modulation and coding scheme of the dedicated system information, scheduling period information of the dedicated system information, a valid time of a period of the dedicated system information, mode information of the dedicated system information or a valid time of a mode of the dedicated system information.

In the embodiment of the application, if the terminal device has acquired a time-frequency resource occupied by the dedicated system information, the system information may only include a sending period of the dedicated system information and/or the modulation and coding scheme of the common system information, etc. For example, for compatibility with the existing network, when the period information and time-frequency resource information of the dedicated system information may be acquired in the existing network state, the scheduling information in the embodiments of the application may only include at least one of the modulation and coding scheme, the valid time of the dedicated system information and the valid time of the mode of the dedicated system information, etc. Of course, all of the period information, time-frequency resource, modulation and coding scheme and the like of the dedicated system information may also be included.

It is to be understood that the scheduling information includes scheduling information of the common system information and/or scheduling information for the dedicated system information. The scheduling information may be scheduling information based on a new network and may also be scheduling information compatible with the existing network. The embodiments of the application are not limited thereto.

Specifically, the scheduling information not only includes the time-frequency resource, a space-domain resource, the period information, the mode information and the like but also may include the valid time of the period and the valid time of the mode. When the network device is required to periodically send the system information, the valid time of the period is required to be determined. For example, the system information is sent every 10 ms, a valid time of a 10 ms period is 30 s and the system information may not be sent any more in case of exceeding 30 s. When the network device is required to send according to the mode, the valid time of the mode is required to be determined. For example, the system information is sent at intervals 30 ms, 40 ms and 60 ms respectively, the valid time of the mode is 50 s and the system information may not be sent any more in case of exceeding 50 s. Stopping sending the system information in a valid time manner may avoid resource waste caused by unlimited sending and further improve system information sending efficiency.

As an optional embodiment, the system information includes the dedicated system information. S110 includes that: the network device sends scheduling information for the dedicated system information through the common system information. S210 includes that: the terminal device receives the scheduling information, sent by the network device through the system information, of the dedicated system information.

Specifically, for how to send the scheduling information for the dedicated system information by the network device, the scheduling information for the dedicated system information may be sent in an independent broadcast, unicast or multicast manner and may also be sent in a manner of containing the scheduling information for the dedicated system information in the system information. It may be specified by the network protocol that a certain common system information contains the scheduling information for the dedicated system information. It may also be specified by the network protocol that some common system information contains the scheduling information for the dedicated system information. The embodiment of the application is not limited thereto. For example, the network device is required to send three pieces of scheduling information, the three pieces of scheduling information may be contained in a common system information for sending, the three pieces of scheduling information may also be contained in two pieces of common system information for sending and the three pieces of scheduling information may further be contained in three pieces of common system information for sending. The specific system information for containing may be specified according to the network protocol.

Optionally, the network device may send the scheduling information of the common system information in the independent broadcast, unicast or multicast manner and may also contain the scheduling information of the common system information in the dedicated system information for sending. It may be specified by the network protocol that a certain dedicated system information contains the scheduling information of the common system information. It may also be specified by the network protocol that some dedicated system information contains the scheduling information of the common system information. The embodiments of the application are not limited thereto.

As an optional embodiment, the system information includes the dedicated system information. S110 includes that: the network device sends third indication information, the third indication information indicating the scheduling information for the dedicated system information. S210 includes that: the terminal device receives the third indication information sent by the network device.

Specifically, the scheduling information for the dedicated system information may be indicated by the third indication information. For example, a certain special bit indicates the scheduling information for the dedicated system information. For example, when the bit is 0, it may be indicated that a first resource block is adopted to send the dedicated system information. When the bit is 1, it may be indicated that a second resource block may be adopted to send the dedicated system information. Specifically, how to indicate the scheduling information for the dedicated system information by the third indication information may be configured according to the network and may also be specified according to the network protocol. The third indication information may also be sent in the multicast, unicast or broadcast manner. Of course, scheduling information of multiple pieces of dedicated system information may be sent together and may also be sent in at least two parts. Part of the third indication information may be sent in the multicast manner, the other part of the third indication information is sent in the broadcast manner, and the like.

It is to be understood that the third indication information and the abovementioned first indication information and/or second indication information may be the same indication information and may also be different indication information. The first indication information, the second indication information and the third indication information may be sent respectively and may also be sent together. Or two of the three pieces of indication information are, sent together. The embodiment of the application is not limited thereto. Furthermore, the third indication information may be sent in the broadcast, multicast or unicast manner. Of course, the three pieces of indication information may be contained in the common system information and may also be contained in the dedicated system information. The embodiment of the application is not limited thereto.

Alternatively, the scheduling information of the common system information may also be indicated through other indication information. The embodiments of the application are not limited thereto. The indication information for the scheduling information of the common system information may be sent together with the third indication information and may also be sent respectively. The broadcast, unicast or multicast manner may be adopted for sending. The embodiments of the application are not limited thereto.

As an optional embodiment, the system information includes the dedicated system information. S110 includes that: the network device sends at least one scheduling information, each scheduling information in the at least one scheduling information corresponding to at least one dedicated system information. S210 includes that: the terminal device receives the at least one scheduling information sent by the network device.

As an optional embodiment, before the operation that the network device sends the system information according to the scheduling information, the method 100 further includes that: the network device sends identification information, the identification information being configured to identify valid scheduling information in the at least one scheduling information. S120 includes that: the network device sends the dedicated system information corresponding to the valid scheduling information according to the valid scheduling information. Before the operation that the terminal device receives the system information sent by the network device, S210 includes that: the terminal device receives the at least one scheduling information sent by the network device; and the terminal device receives the identification information sent by the network device, the identification information being configured to identify the valid scheduling information in the at least one scheduling information. S220 includes that: the terminal device receives the dedicated system information corresponding to the valid scheduling information according to the valid scheduling information.

It is to be noted that the at least one scheduling information and the identification information may be sent together and may also be sent respectively. The at least one scheduling information may be sent in the broadcast manner and the identification information is sent in the multicast manner. The identification information may only identify the valid scheduling information and may also identify a corresponding relationship between the identification information and the at least one scheduling information. For example, the corresponding relationship may be a corresponding relationship between the identification information and the valid scheduling and invalid scheduling information in the at least one scheduling information. The embodiment of the application is not limited thereto.

Specifically, each scheduling information in at least two pieces of scheduling information corresponds to one or more pieces of dedicated system information. That is, two pieces of dedicated system information may share the same scheduling information. When the network device sends the at least one scheduling information to the terminal device, the terminal device receives the at least one scheduling information. The network device may not send the dedicated system information corresponding to all of the scheduling information. Therefore, the network device is required to send the identification information, the identification information identifying the valid scheduling information. The network device may send the dedicated system information corresponding to the valid scheduling information. The terminal device may receive the dedicated system information corresponding to the valid scheduling information.

Figure 3:
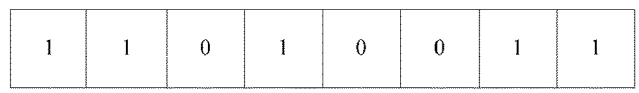
FIG. 3 is another schematic diagram of an information transmission method according to an embodiment of the application.

For example, the network device may send a group of identification information to the terminal device to identify the valid scheduling information for the dedicated system information. For convenient understanding, for example, as shown in FIG. 3, eight bits may be adopted to identify eight pieces of specific scheduling information. For example, when the network device sends the eight bits, the terminal device, when receiving them, may obtain that the first, second, fourth, seventh and eighth scheduling information is valid scheduling information and receive the corresponding dedicated system information on resources corresponding to the valid scheduling information.

Alternatively, the network device may also send multiple pieces of scheduling information to the terminal device, each scheduling information in the multiple pieces of scheduling information corresponding to at least one common system information. The network device is required to send identification information of the multiple pieces of scheduling information to the terminal device to identify the valid scheduling information. The terminal device receives the common system information on the corresponding valid scheduling information. The embodiment of the application is not limited thereto.

Alternatively, sending of the at least one scheduling information by the network device may be direct sending by the network device. Sending of the at least one scheduling information by the network device may also be sending based on a request of the terminal device. The terminal device sends a request message to the network device, the request message being configured to request for first dedicated system information. The network device may not only send scheduling information for the first dedicated system information according to the request message but also send the scheduling information of all or part of the dedicated system information supported by the network device. In such a manner, a first terminal device may request for scheduling information of multiple pieces of dedicated system information in a single request manner, and the terminal device requiring other dedicated system information may directly receive it at a resource location of the required dedicated system information. Therefore, the signaling overhead is further reduced, and the resource utilization rate is increased.

As an optional embodiment, before S210, the method further includes that: the terminal device sends a request message to the network device, the request message being configured to request for first dedicated system information. S220 includes that: the terminal device receives scheduling information, sent by the network device according to the request message, of the first dedicated system information. Before S110, the method further includes that: the network device receives the request message sent by the terminal device, the request message being configured to request for the first dedicated system information. S110 includes that: the network device sends the scheduling information for the first dedicated system information according to the request message.

Specifically, the terminal device sends the request message configured to request for the first dedicated system information to the network device and the network device may send the scheduling information for the first dedicated system information according to the request message and may also send the scheduling information of all or part of the dedicated system information. There are no limits made thereto in the embodiment of the application.

More specifically, the terminal device requiring the first dedicated system information sends the request message to the network device to request for the first dedicated system information. The network device, when receiving the request message, sends the scheduling information for the first dedicated system information to the first terminal device. The terminal device receives the scheduling information. The network device sends the first dedicated system information according to the scheduling information. The terminal device receives the first dedicated system information according to the scheduling information. Therefore, the network device sends the first dedicated system information according to a request of the terminal device, the network device is prevented from periodically broadcasting all system messages, and furthermore, the signaling overhead is reduced and the resource utilization rate is increased.

Alternatively, the terminal device determines whether the network device supports the first dedicated system information or not according to the first indication information. When the network device supports the first dedicated system information, the terminal device sends the request message to the network device. The terminal device, responsive to determining that the network device does not support the first dedicated system information according to the first indication information, may not send request information to the network device.

It is to be understood that, in the embodiment of the application, that the terminal device requests for the scheduling information through the request message is only a preferred embodiment. In a practical application process, the network device may directly send the scheduling information and the network device may determine the presently sent scheduling information according to a sending time or sending manner of historical scheduling information or the network device sends the scheduling information for the system information and the like according to probability data. For example, CCTV news is broadcast at 19:00 everyday, and the network device may send scheduling information for system information about data of CCTV news and the like at 19:00 everyday. The embodiment of the application is not limited thereto.

As an optional embodiment, the operation that the network device sends the system information according to the scheduling information may include that: the network device sends the dedicated system information according to a sending mode for the dedicated system information, the sending mode including a one-time sending mode, a multiple aperiodic sending mode or a periodic sending mode.

Optionally, for a dedicated system information, scheduling information for the dedicated system information may indicate the one-time sending mode, the multiple aperiodic sending mode or the periodic sending mode. Of course, the network device may also determine a first sending mode, the multiple aperiodic sending mode or the periodic sending mode and the sending mode is not required to be indicated through the scheduling information. There are no limits made in the embodiment of the application.

In the embodiment of the application, for how to send the dedicated system information by the network device, the dedicated system information may be sent according to a configuration of the network device. For example, the dedicated system information is sent once in the broadcast, unicast or multicast manner. Or the dedicated system information is sent for many times in the broadcast, unicast or multicast manner and sending for many times in the broadcast, unicast or multicast manner may refer to sending at unequal time intervals. Or the dedicated system information is periodically sent in the broadcast, unicast or multicast manner.

Alternatively, the same or different sending modes may be adopted for each dedicated system information. For example, the multiple aperiodic sending mode may be adopted for the first dedicated system information and the periodic sending mode may be adopted for second dedicated system information. Or the multiple aperiodic sending mode is adopted for the first dedicated system information in a specific time period, the one-time sending mode is adopted for the first dedicated system information in another time period, and the like. The specific sending mode adopted for each dedicated system information may be configured through the network or specified through the network protocol. The embodiments of the application are not limited thereto.

For example, the one-time sending mode may refer to sending the dedicated system information once. The multiple aperiodic sending mode may refer to sending the dedicated system information for many times. The periodic system mode may refer to periodically sending the dedicated system information. Sending the dedicated system information for many times may refer to sending according to a specific time interval. For example, the first dedicated system information is sent at intervals 30 ms, 40 ms and 60 ms respectively. Periodically sending the dedicated system information may refer to that it is specified by the network protocol that the dedicated system information and the like are sent once every 20 ms. Specifically, these sending modes may be specified according to the network protocol and may also be configured for the terminal device through the network. The embodiment of the application is not limited thereto. Furthermore, the sending mode of the dedicated system information may be determined on the basis of the scheduling information. For example, it is determined on the basis of the scheduling information that the multiple aperiodic sending mode refers to sending the first dedicated system information at the intervals 30 ms, 40 ms and 60 ms respectively. That is, the sending mode of the dedicated system information may be included in the scheduling information or a certain special bit in the scheduling information may indicate the sending mode of the dedicated system information.

As an optional embodiment, when the terminal device is within a service range of the network device, the network device, after returning the scheduling information, may send the dedicated system information once in the broadcast or multicast manner to ensure that it may be received by the terminal device. When other terminal devices are attached to the network device one after another, one-time sending may not ensure that these terminal devices which are attached later may receive the dedicated system information, so that it is necessary to send the dedicated system information for many times or periodically. In case of sending for many times or periodic sending, the terminal devices which are attached later may also not know the scheduling information for the dedicated system information, so that the network device is required to send the scheduling information for the dedicated system information again to ensure that the latter terminal devices may correctly receive the dedicated system information and further improve data transmission stability.

As an optional embodiment, the operation that the network device sends the scheduling information for the system information includes that: the network device sends the scheduling information for the system information in the unicast, multicast or broadcast manner.

Specifically, there may be one or more pieces of scheduling information. The scheduling information may be sent in the unicast, multicast or broadcast manner. Or part of the scheduling information is sent in the broadcast manner and part of the scheduling information is sent in the multicast manner and the like.

As an optional embodiment, the operation that the network device sends the system information according to the scheduling information includes that: the network device sends the system information according to the scheduling information in the unicast, multicast or broadcast manner.

Specifically, there may be one or more pieces of system information. The system information may be sent in the unicast, multicast or broadcast manner. Or part of the system information is sent in the broadcast manner and part of the system information is sent in the multicast manner and the like. Specifically, the dedicated system information may be sent in the multicast, unicast or broadcast manner. The common system information may be sent in the multicast, unicast or broadcast manner. Or part of the dedicated system information is sent in the broadcast manner and part of the dedicated system information is sent in the unicast manner. Or part of the common system information is sent in the broadcast manner and part of the common system information is sent in the multicast manner and the like in the embodiment of the application.

As an example, there are five terminal devices A, B, C, D and E in a cell served by the network device, A, B and C being terminal devices of a first type and D and E being terminal devices of a second type. The network device may send first dedicated system information to A, B and C in the multicast manner and send second dedicated system information to D and E in the multicast manner. Or the first dedicated system information to A, B, C, D and E in the broadcast manner, which does not form limits to the embodiment of the application. Or the first dedicated system information to A, B and C in the unicast manner and the second dedicated system information is sent to D and E in the multicast manner, which is not limited in the application.

It is to be understood that, in the embodiment of the application, the system information may not form a one-to-one corresponding relationship with the scheduling information. For example, two pieces of system information may share the same scheduling information. Specifically, the dedicated system information may not form the one-to-one corresponding relationship with the scheduling information for the dedicated system information. For example, the two pieces of dedicated system information share the same scheduling information. There are no limits made thereto in the embodiment of the application.

Figure 4:
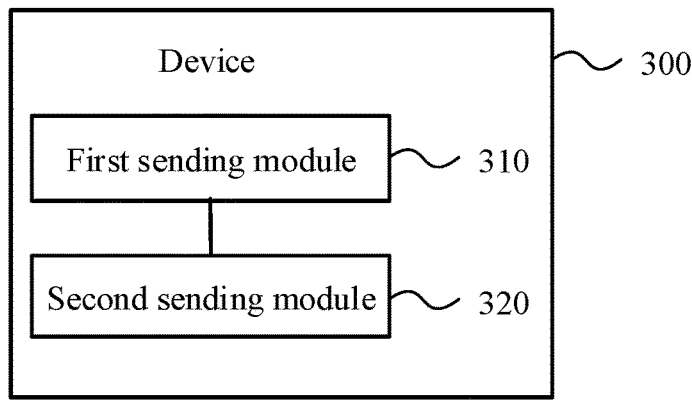
FIG. 4 is a schematic block diagram of an information transmission device according to an embodiment of the application.

FIG. 4 is a schematic diagram of an information transmission device 300 according to an embodiment of the application. For example, the device 300 may be a network device. The device 300 includes a first sending module 310 and a second sending module 320.

The first sending module 310 is configured to send scheduling information for system information.

The second sending module 320 is configured to send the system information according to the scheduling information.

It is to be understood that the first sending module 310 and the second sending module 320 are only functionally divided. The first sending module 310 and the second sending module 320 may be the same sending module and may also be different sending modules. The embodiment of the application is not limited thereto.

As an optional embodiment, the first sending module 310 is further configured to, before the scheduling information for the system information is sent, send first indication information, the first indication information indicating dedicated system information supported by the device 300 and/or common system information supported by the device 300.

As an optional embodiment, the first sending module 310 is further configured to, before the system information is sent according to the scheduling information, send second indication information, the second indication information indicating a sending manner for the system information.

As an optional embodiment, the system information includes at least one of dedicated system information or common system information, the second indication information indicates that a sending manner for the dedicated system information is based on scheduling, and/or the second indication information indicates that a sending manner for the common system information is based on scheduling or based on pre-configured radio resource.

As an optional embodiment, the system information includes the common system information, and the scheduling information for the system information includes at least one of a time-frequency resource occupied by the common system information, a scheduling period of the common system information, a modulation and coding scheme of the common system information or a valid time of the scheduling period of the common system information.

As an optional embodiment, the system information includes the dedicated system information, and the scheduling information for the system information includes at least one of time-frequency resource information of the dedicated system information, a modulation and coding scheme of the dedicated system information, scheduling period information of the dedicated system information, a valid time of a period of the dedicated system information, mode information of the dedicated system information or a valid time of a mode of the dedicated system information.

As an optional embodiment, the system information includes the dedicated system information. The first sending module 310 is specifically configured to send scheduling information for the dedicated system information through the common system information.

As an optional embodiment, the system information includes the dedicated system information. The first sending module 310 is specifically configured to send third indication information, the third indication information indicating the scheduling information for the dedicated system information.

As an optional embodiment, the system information includes the dedicated system information. The first sending module 310 is specifically configured to send at least one scheduling information, each scheduling information in the at least one scheduling information corresponding to at least one dedicated system information.

As an optional embodiment, the first sending module 310 is further configured to, before the system information is sent according to the scheduling information, send identification information, the identification information being configured to identify valid scheduling information in the at least one scheduling information. The second sending module 320 is specifically configured to send the dedicated system information corresponding to the valid scheduling information according to the valid scheduling information.

As an optional embodiment, the device 300 further includes a receiving module, configured to, before the scheduling information for the system information is sent, receive a request message sent by a terminal device, the request message being configured to request for first dedicated system information. The first sending module 310 is specifically configured to send scheduling information for the first dedicated system information according to the request message.

As an optional embodiment, the system information includes the dedicated system information. The second sending module 320 is specifically configured to send the dedicated system information according to a sending mode for the dedicated system information, the sending mode including a one-time sending mode, a multiple aperiodic sending mode or a periodic sending mode.

As an optional embodiment, the first sending module 310 is specifically configured to send the scheduling information for the system information in a unicast, multicast or broadcast manner.

As an optional embodiment, the second sending module 320 is specifically configured to send the system information according to the scheduling information in the unicast, multicast or broadcast manner.

It is to be understood that the device 300 described herein is embodied in form of functional module. Term "module" mentioned herein may refer to an Application Specific Integrated Circuit (ASIC), an electronic circuit, a processor (for example, a shared processor, a dedicated processor or a group processor) and memory configured to execute one or more software or firmware programs, a merged logic circuit and/or another proper component supporting the described functions. In an optional example, those skilled in the art may know that the device 300 may specifically be the network device in the abovementioned embodiments and the device 300 may be configured to execute each flow and/or operation corresponding to the network device in the abovementioned method embodiments, which will not be elaborated herein for avoiding repetitions.

Figure 5:
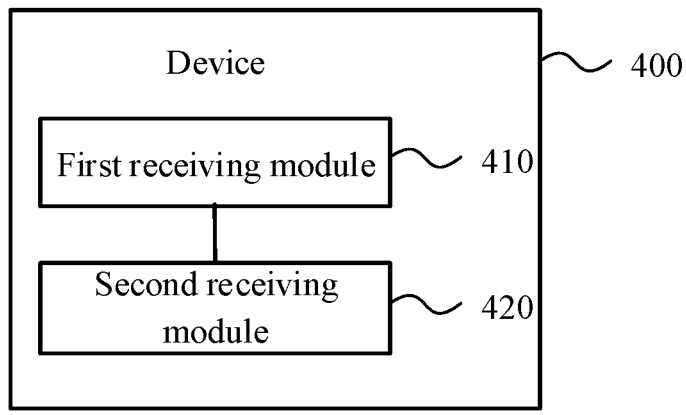
FIG. 5 is another schematic block diagram of an information transmission device according to an embodiment of the application.

FIG. 5 is a schematic diagram of an information transmission device 400 according to an embodiment of the application. For example, the device 400 may be a terminal device. The device 400 includes a first receiving module 410 and a second receiving module 420.

The first receiving module 410 is configured to receive scheduling information for system information from a network device.

The second receiving module 420 is configured to receive the system information sent by the network device according to the scheduling information.

It is to be understood that the first receiving module 410 and the second receiving module 420 are only functionally divided. The first receiving module 410 and the second receiving module 420 may be the same receiving module and may also be different receiving modules. The embodiment of the application is not limited thereto.

As an optional embodiment, the first receiving module 410 is further configured to, before the scheduling information for the system information is received from the network device, receive first indication information sent by the network device, the first indication information indicating at least one of dedicated system information supported by the network device or common system information supported by the network device.

As an optional embodiment, the first receiving module 410 is specifically configured to, before the system information sent by the network device is received according to the scheduling information, receive second indication information, the second indication information indicating a sending manner for the system information.

As an optional embodiment, the system information includes at least one of dedicated system information or common system information, the second indication information indicates that a sending manner for the dedicated system information is based on scheduling, and/or the second indication information indicates that a sending manner for the common system information is based on scheduling or based on pre-configured radio resource.

As an optional embodiment, the system information includes the common system information, and the scheduling information for the system information includes at least one of a time-frequency resource occupied by the common system information, a scheduling period of the common system information, a modulation and coding scheme of the common system information or a valid time of the scheduling period of the common system information.

As an optional embodiment, the system information includes the dedicated system information, and the scheduling information for the system information includes at least one of time-frequency resource information of the dedicated system information, a modulation and coding scheme of the dedicated system information, scheduling period information of the dedicated system information, a valid time of a period of the dedicated system information, mode information of the dedicated system information or a valid time of a mode of the dedicated system information.

As an optional embodiment, the system information includes the dedicated system information. The first receiving module 410 is specifically configured to receive scheduling information, sent by the network device through the system information, of the dedicated system information.

As an optional embodiment, the system information includes the dedicated system information. The first receiving module 410 is specifically configured to receive third indication information sent by the network device, the third indication information indicating the scheduling information for the dedicated system information.

As an optional embodiment, the system information includes the dedicated system information. The first receiving module 410 is specifically configured to receive at least one scheduling information sent by the network device, each scheduling information in the at least one scheduling information corresponding to at least one dedicated system information.

As an optional embodiment, the first receiving module 410 is further specifically configured to, before the system information sent by the network device is received, receive identification information sent by the network device, the identification information being configured to identify valid scheduling information in the at least one scheduling information. The second receiving module 420 is specifically configured to receive the dedicated system information corresponding to the valid scheduling information according to the valid scheduling information.

As an optional embodiment, the device 400 further includes a sending module, configured to, before the scheduling information for the system information is received from the network device, send a request message to the network device, the request message being configured to request for first dedicated system information. The first receiving module 410 is specifically configured to receive scheduling information, sent by the network device according to the request message, of the first dedicated system information.

It is to be understood that the device 400 described herein is embodied in form of functional module. Term "module" mentioned herein may refer to an ASIC, an electronic circuit, a processor (for example, a shared processor, a dedicated processor or a group processor) and memory configured to execute one or more software or firmware programs, a merged logic circuit and/or another proper component supporting the described functions. In an optional example, those skilled in the art may know that the device 400 may specifically be the terminal device in the abovementioned embodiments and the device 400 may be configured to execute each flow and/or operation corresponding to the terminal device in the abovementioned method embodiments, which will not be elaborated herein for avoiding repetitions.

Figure 6:
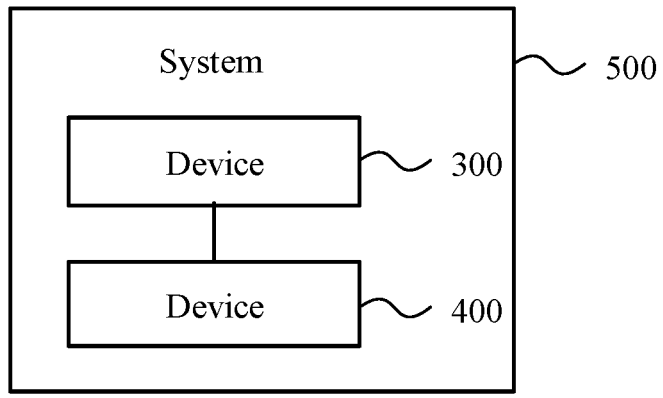
FIG. 6 is a schematic block diagram of an information transmission system according to an embodiment of the application.

FIG. 6 is a schematic structure diagram of an information transmission system 500 according to an embodiment of the application. The communication system 500 includes a device 300 and a device 400. Optionally, there may be one or more devices 400.

Figure 7:
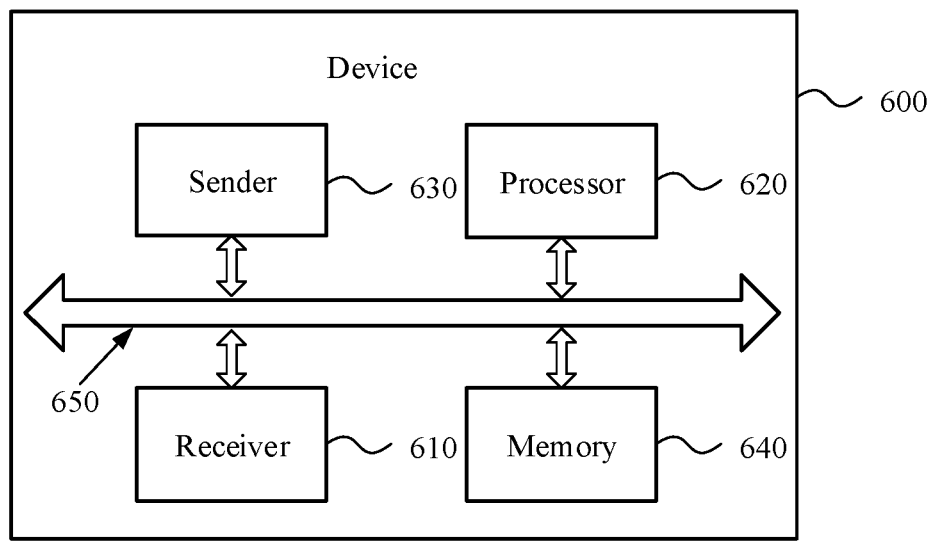
FIG. 7 is a schematic block diagram of an information transmission device according to an embodiment of the application.

FIG. 7 illustrates an information transmission device 600 according to an embodiment of the application. For example, the device 600 may be a network device. The device 600 includes a receiver 610, a processor 620, a sender 630, a memory 640 and a bus system 650. The receiver 610, the processor 620, the sender 630 and the memory 640 are connected through the bus system 650. The memory 640 is configured to store an instruction. The processor 620 is configured to execute the instruction stored in the memory 640 to control the receiver 610 to receive a signal and control the sender 630 to send an instruction.

The sender 630 is configured to send scheduling information for system information. The sender 630 is further configured to send the system information according to the scheduling information.

As an optional embodiment, the sender 630 is further configured to, before the scheduling information for the system information is sent, send first indication information, the first indication information indicating dedicated system information supported by the device 600 and/or common system information supported by the device 600.

As an optional embodiment, the sender 630 is further configured to, before the system information is sent according to the scheduling information, send second indication information, the second indication information indicating a sending manner for the system information.

As an optional embodiment, the system information includes at least one of dedicated system information or common system information, the second indication information indicates that a sending manner for the dedicated system information is based on scheduling, and/or the second indication information indicates that a sending manner for the common system information is based on scheduling or based on pre-configured radio resource.

As an optional embodiment, the system information includes the common system information, and the scheduling information for the system information includes at least one of a time-frequency resource occupied by the common system information, a scheduling period of the common system information, a modulation and coding scheme of the common system information or a valid time of the scheduling period of the common system information.

As an optional embodiment, the system information includes the dedicated system information, and the scheduling information for the system information includes at least one of time-frequency resource information of the dedicated system information, a modulation and coding scheme of the dedicated system information, scheduling period information of the dedicated system information, a valid time of a period of the dedicated system information, mode information of the dedicated system information or a valid time of a mode of the dedicated system information.

As an optional embodiment, the system information includes the dedicated system information. The sender 630 is specifically configured to send scheduling information for the dedicated system information through the common system information.

As an optional embodiment, the system information includes the dedicated system information. The sender 630 is specifically configured to send third indication information, the third indication information indicating the scheduling information for the dedicated system information.

As an optional embodiment, the system information includes the dedicated system information. The sender 630 is specifically configured to send at least one scheduling information, each scheduling information in the at least one scheduling information corresponding to at least one dedicated system information.

As an optional embodiment, the sender 630 is further configured to, before the system information is sent according to the scheduling information, send identification information, the identification information being configured to identify valid scheduling information in the at least one scheduling information. The sender 630 is specifically configured to send the dedicated system information corresponding to the valid scheduling information according to the valid scheduling information.

As an optional embodiment, the receiver 610 is configured to, before the scheduling information for the system information is sent, receive a request message sent by a terminal device, the request message being configured to request for first dedicated system information. The sender 630 is specifically configured to send scheduling information for the first dedicated system information according to the request message.

As an optional embodiment, the system information includes the dedicated system information. The sender 630 is specifically configured to send the dedicated system information according to a sending mode for the dedicated system information, the sending mode including a one-time sending mode, a multiple aperiodic sending mode or a periodic sending mode.

As an optional embodiment, the sender 630 is specifically configured to send the scheduling information for the system information in a unicast, multicast or broadcast manner.

As an optional embodiment, the sender 630 is specifically configured to send the system information according to the scheduling information in the unicast, multicast or broadcast manner.

It is to be understood that the device 600 may specifically be the network device in the abovementioned embodiments and may be configured to execute each operation and/or flow corresponding to the network device in the abovementioned method embodiments. Optionally, the memory 640 may include a Read-Only Memory (ROM) and a Random Access Memory (RAM) and provides an instruction and data for the processor. A part of the memory may further include a nonvolatile RAM. For example, the memory may further store information of a device type. The processor 620 may be configured to execute the instruction stored in the memory, and when the processor executes the instruction, the processor may execute each operation corresponding to the network device in the abovementioned method embodiments.

Figure 8:
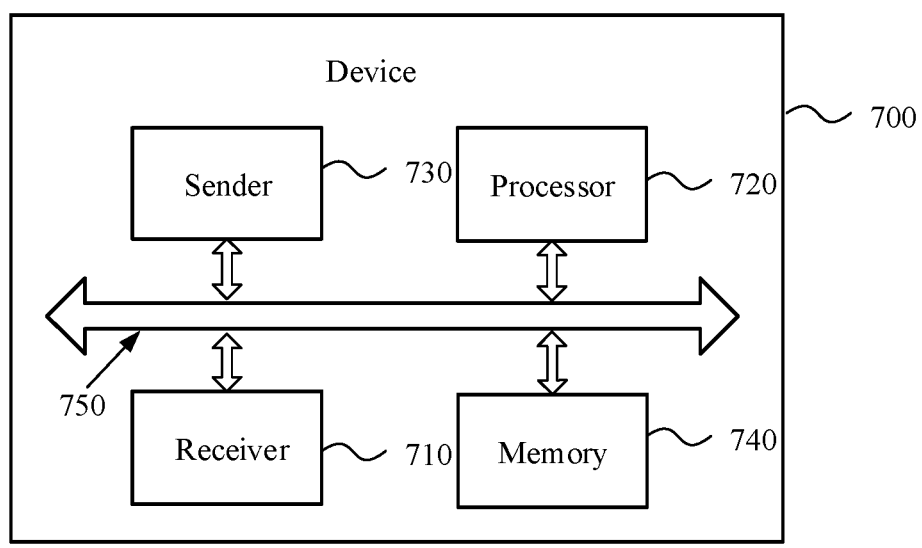
FIG. 8 is another schematic block diagram of an information transmission device according to an embodiment of the application.

FIG. 8 illustrates an information transmission device 700 according to an embodiment of the application. For example, the device 700 may be a terminal device. The device 700 includes a receiver 710, a processor 720, a sender 730, a memory 740 and a bus system 750. The receiver 710, the processor 720, the sender 730 and the memory 740 are connected through the bus system 750. The memory 740 is configured to store an instruction. The processor 720 is configured to execute the instruction stored in the memory 740 to control the receiver 710 to receive a signal and control the sender 730 to send an instruction.

The receiver 710 is configured to receive scheduling information for system information from a network device. The receiver 710 is further configured to receive the system information sent by the network device according to the scheduling information.

As an optional embodiment, the receiver 710 is further configured to, before the scheduling information for the system information is received from the network device, receive first indication information sent by the network device, the first indication information indicating at least one of dedicated system information supported by the network device or common system information supported by the network device.

As an optional embodiment, the receiver 710 is specifically configured to, before the system information sent by the network device is received according to the scheduling information, receive second indication information, the second indication information indicating a sending manner for the system information.

As an optional embodiment, the system information includes at least one of dedicated system information or common system information, the second indication information indicates that a sending manner for the dedicated system information is based on scheduling, and/or the second indication information indicates that a sending manner for the common system information is based on scheduling or based on pre-configured radio resource.

As an optional embodiment, the system information includes the common system information, and the scheduling information for the system information includes at least one of a time-frequency resource occupied by the common system information, a scheduling period of the common system information, a modulation and coding scheme of the common system information or a valid time of the scheduling period of the common system information.

As an optional embodiment, the system information includes the dedicated system information, and the scheduling information for the system information includes at least one of time-frequency resource information of the dedicated system information, a modulation and coding scheme of the dedicated system information, scheduling period information of the dedicated system information, a valid time of a period of the dedicated system information, mode information of the dedicated system information or a valid time of a mode of the dedicated system information.

As an optional embodiment, the system information includes the dedicated system information. The receiver 710 is specifically configured to receive scheduling information, sent by the network device through the system information, of the dedicated system information.

As an optional embodiment, the system information includes the dedicated system information. The receiver 710 is specifically configured to receive third indication information sent by the network device, the third indication information indicating the scheduling information for the dedicated system information.

As an optional embodiment, the system information includes the dedicated system information. The receiver 710 is specifically configured to receive at least one scheduling information sent by the network device, each scheduling information in the at least one scheduling information corresponding to at least one dedicated system information.

As an optional embodiment, the receiver 710 is further specifically configured to, before the system information sent by the network device is received, receive identification information sent by the network device, the identification information being configured to identify valid scheduling information in the at least one scheduling information. The receiver 710 is specifically configured to receive the dedicated system information corresponding to the valid scheduling information according to the valid scheduling information.

As an optional embodiment, the sender 730 is configured to, before the scheduling information for the system information is received from the network device, send a request message to the network device, the request message being configured to request for first dedicated system information. The receiver 710 is specifically configured to receive scheduling information, sent by the network device according to the request message, of the first dedicated system information.

It is to be understood that the device 700 may specifically be the terminal device in the abovementioned embodiments and may be configured to execute each operation and/or flow corresponding to the terminal device in the abovementioned method embodiments. Optionally, the memory 740 may include a ROM and a RAM and provides an instruction and data for the processor. A part of the memory may further include a nonvolatile RAM. For example, the memory may further store information of a device type. The processor 720 may be configured to execute the instruction stored in the memory, and when the processor executes the instruction, the processor may execute each operation corresponding to the terminal device in the abovementioned method embodiments.

It is to be understood that, in the embodiments of the application, the processor 620 and the processor 720 may be Central Processing Units (CPUs) and the processor may also be another universal processor, a Digital Signal Processor (DSP), an ASIC, a Field-Programmable Gate Array (FPGA) or another programmable logic device, discrete gate or transistor logic device and discrete hardware component and the like. The universal processor may be a microprocessor or the processor may also be any conventional processor and the like.

It should be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It should be understood that, in various embodiments of the application, a magnitude of a sequence number of each process does not mean an execution sequence and the execution sequence of each process should be determined by its function and an internal logic and should not form any limit to an implementation process of the embodiments of the application.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method for information transmission, comprising:
sending, by a network device, first indication information to a terminal device, the first indication information indicating at least one of dedicated system information supported by the network device;
receiving, by the network device, a request message sent from the terminal device, the request message being configured to request for first dedicated system information;
sending, by the network device, multiple pieces of scheduling information and multiple pieces of identification information to a terminal device simultaneously, wherein the multiple pieces of identification information are configured to identify valid scheduling information in the multiple pieces of scheduling information, the multiple pieces of scheduling information correspond to the multiple pieces of identification information one to one, and the multiple pieces of scheduling information comprise scheduling information of the first dedicated system information; and
sending, by the network device, the first dedicated system information according to the scheduling information of the first dedicated system information.

2. The method of claim 1, wherein the multiple pieces of scheduling information comprises:
at least one of time-frequency resource information of the dedicated system information, a modulation and coding scheme of the dedicated system information, scheduling period information of the dedicated system information, a valid time of a period of the dedicated system information, mode information of the dedicated system information or a valid time of a mode of the dedicated system information, wherein the mode information indicates a one-time sending mode, a multiple aperiodic sending mode or a periodic sending mode.

3. The method of claim 1, wherein each scheduling information in the multiple pieces of scheduling information corresponding to at least one dedicated system information.

4. The method claim 1, wherein the system information corresponding to the valid scheduling information is sent on system information corresponding to the valid scheduling information.

5. A method for information transmission, comprising:
receiving, by the terminal device, first indication information sent by a network device, the first indication information indicating at least one of dedicated system information supported by the network device;
sending, by the terminal device, a request message to the network device, the request message being configured to request for first dedicated system information;
receiving, by a terminal device, multiple pieces of scheduling information and multiple pieces of identification information from the network device simultaneously, wherein the multiple pieces of identification information are configured to identify valid scheduling information in the multiple pieces of scheduling information, the multiple pieces of scheduling information corresponding to the multiple pieces of identification information one to one, and the multiple pieces of scheduling information comprise scheduling information of the first dedicated system information; and
receiving, by the terminal device, the first dedicated system information according to the scheduling information of the first dedicated system information.

6. The method of claim 5, further comprising:
before receiving, by the terminal device, the system information corresponding to the valid scheduling information, receiving, by the terminal device, second indication information sent by the network device, the second indication information indicating a sending manner for the system information.

7. The method of claim 5, wherein the multiple pieces of scheduling information comprises:
at least one of time-frequency resource information of the dedicated system information, a modulation and coding scheme of the dedicated system information, scheduling period information of the dedicated system information, a valid time of a period of the dedicated system information, mode information of the dedicated system information or a valid time of a mode of the dedicated system information, wherein the mode information indicates a one-time sending mode, a multiple aperiodic sending mode or a periodic sending mode.

8. The method of claim 5, wherein each scheduling information in the multiple pieces of scheduling information corresponding to at least one dedicated system information.

9. The method claim 5, wherein the system information corresponding to the valid scheduling information is received on system information corresponding to the valid scheduling information.

10. A device for information transmission, comprising:
a receiver configured to:
receive first indication information sent by a network device, the first indication information indicating at least one of dedicated system information supported by the network device;
send a request message to the network device, the request message being configured to request for first dedicated system information;
receive multiple pieces of scheduling information and multiple pieces of identification information from the network device simultaneously, wherein the multiple pieces of identification information are configured to identify valid scheduling information in the multiple pieces of scheduling information, the multiple pieces of scheduling information corresponding to the multiple pieces of identification information one to one, and the multiple pieces of scheduling information comprise scheduling information of the first dedicated system information; and
receive the first dedicated system information according to the scheduling information of the first dedicated system information.

11. The device of claim 10, wherein the receiver is specifically configured to:
before the system information corresponding to the valid scheduling information is received, receive second indication information sent by the network device, the second indication information indicating a sending manner for the system information.

12. The device of claim 10, wherein the multiple pieces of scheduling information comprises:
at least one of time-frequency resource information of the dedicated system information, a modulation and coding scheme of the dedicated system information, scheduling period information of the dedicated system information, a valid time of a period of the dedicated system information, mode information of the dedicated system information or a valid time of a mode of the dedicated system information, wherein the mode information indicates a one-time sending mode, a multiple aperiodic sending mode or a periodic sending mode.

13. The device of claim 10, wherein
each scheduling information in the multiple pieces of scheduling information corresponding to at least one dedicated system information.

14. The device of claim 10, wherein the system information corresponding to the valid scheduling information is received on system information corresponding to the valid scheduling information.

\* \* \* \* \*